(12) United States Patent
Tsuji et al.

(10) Patent No.: US 10,649,207 B1
(45) Date of Patent: May 12, 2020

(54) DISPLAY SYSTEM, INFORMATION PRESENTATION SYSTEM, METHOD FOR CONTROLLING DISPLAY SYSTEM, RECORDING MEDIUM, AND MOBILE BODY

(71) Applicant: Panasonic Intellectual Property Management Co., Ltd., Osaka (JP)

(72) Inventors: Masanaga Tsuji, Osaka (JP); Tadashi Shibata, Osaka (JP); Nobuyuki Nakano, Aichi (JP); Akira Tanaka, Osaka (JP); Shohei Hayashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/724,766

(22) Filed: Dec. 23, 2019

Related U.S. Application Data

(63) Continuation of application No. PCT/JP2018/024285, filed on Jun. 27, 2018.

(30) Foreign Application Priority Data

Jun. 30, 2017 (JP) ................. 2017-129898

(51) Int. Cl.
*G02B 27/01* (2006.01)
*G09G 5/00* (2006.01)
(Continued)

(52) U.S. Cl.
CPC .......... *G02B 27/0101* (2013.01); *B60K 35/00* (2013.01); *G08G 1/166* (2013.01);
(Continued)

(58) Field of Classification Search
CPC combination set(s) only.
See application file for complete search history.

(56) References Cited

U.S. PATENT DOCUMENTS 8,531,438 B2 * 9/2013 Arie ..................... G01C 21/367
345/173
10,242,608 B2 * 3/2019 Tanaka ............... G06K 9/00798
(Continued)

FOREIGN PATENT DOCUMENTS

JP          2006-142897     6/2006
JP          2014-213763     11/2014
(Continued)

OTHER PUBLICATIONS

International Search Report of PCT application No. PCT/JP2018/024285 dated Sep. 25, 2018.

*Primary Examiner* — Van N Chow
(74) *Attorney, Agent, or Firm* — Greenblum & Bernstein, P.L.C.

(57) ABSTRACT

A display system includes a display unit which displays a virtual image in a target space, a controller which controls display of the display unit, and an obtaining unit which obtains vibration information about vibration applied to the display unit. The controller changes the display mode of the virtual image based on the vibration information, when the vibration exceeds a first threshold value and a viewing distance of the virtual image exceeds a second threshold value.

10 Claims, 7 Drawing Sheets

(51) Int. Cl.
*B60K 35/00* (2006.01)
*H04N 5/74* (2006.01)
*G08G 1/16* (2006.01)

(52) U.S. Cl.
CPC ............... *G09G 5/00* (2013.01); *H04N 5/74* (2013.01); *B60K 2370/1868* (2019.05); *B60R 2300/205* (2013.01); *G02B 2027/0141* (2013.01); *G09G 2380/10* (2013.01)

(56) References Cited

U.S. PATENT DOCUMENTS

| | | | |
|---|---|---|---|
| 10,422,655 B2 * | 9/2019 | Kosaka | G01C 21/365 |
| 10,464,421 B2 * | 11/2019 | Watanabe | B60K 35/00 |
| 2004/0080541 A1 * | 4/2004 | Saiga | G06F 3/0485 |
| | | | 715/805 |
| 2016/0147073 A1 | 5/2016 | Onda et al. | |
| 2016/0216521 A1 | 7/2016 | Yachida et al. | |
| 2016/0302068 A1 * | 10/2016 | Choi | H04L 63/20 |
| 2017/0084056 A1 | 3/2017 | Masuya et al. | |
| 2018/0157037 A1 | 6/2018 | Kasazumi et al. | |

FOREIGN PATENT DOCUMENTS

| | | |
|---|---|---|
| JP | 2015-101311 | 6/2015 |
| JP | 2015-221651 | 12/2015 |
| JP | 2015-226304 | 12/2015 |
| JP | 2017-013590 | 1/2017 |
| JP | 2017-015918 | 1/2017 |
| JP | 2017-094882 | 6/2017 |
| WO | 2014/208081 | 12/2014 |
| WO | 2015/178355 | 11/2015 |

\* cited by examiner

DISPLAY SYSTEM, INFORMATION PRESENTATION SYSTEM, METHOD FOR CONTROLLING DISPLAY SYSTEM, RECORDING MEDIUM, AND MOBILE BODY

CROSS-REFERENCE TO RELATED APPLICATIONS

This application is a continuation of the PCT International Application No. PCT/JP2018/024285 filed on Jun. 27, 2018, which claims the benefit of foreign priority of Japanese patent application No. 2017-129898 filed on Jun. 30, 2017, the contents all of which are incorporated herein by reference.

TECHNICAL FIELD

The present disclosure relates to a display system, an information presentation system, a method for controlling the display system, a program, and a mobile body, and more particularly, to a display system which displays a virtual image in a target space, an information presentation system, a method for controlling the display system, a program, and a mobile body.

BACKGROUND ART

A dangerous situation warning device is conventionally known which includes a vehicle neighborhood object detection device which detects an object on a front travel area, a danger latent area determination device which determines a danger latent area in which danger is latent, a danger degree processing device, and a warning output device (for example, see Patent Literature (PTL) 1). The danger degree processing device checks object information obtained by the vehicle neighborhood object detection device against the danger latent area obtained by the danger latent area determination device to determine a degree of danger with respect to an object which exists in the danger latent area. When the vehicle neighborhood object detection device detects a plurality of obstacles on the front travel area, the danger degree processing device sets the degree of danger for each of the obstacles and the warning output device displays the degree of danger for each of the obstacles. The warning output device is a head-up display, and displays a red frame surrounding the obstacle determined as having a high degree of danger at a position seen to be overlapping with the obstacle.

CITATION LIST

Patent Literature

PTL 1: Japanese Unexamined Patent Application Publication No. 2015-221651

SUMMARY (SUMMARY OF THE INVENTION)

An object of the present disclosure is to provide a display system, an information presentation system, a display method, a program, and a mobile body which are capable of making the deviation of the display position of a virtual image less noticeable.

A display system according to an aspect of the present disclosure projects an image to be viewed by a target person as if a virtual image is being projected onto a target space. The display system includes a display unit, a controller, and a vibration information obtaining unit which obtains vibration information. The display unit displays the image. The controller controls the display of the display unit. The vibration information obtaining unit obtains the vibration information about vibration applied to the display unit. When the vibration exceeds a first threshold value and the viewing distance of a portion of the virtual image exceeds a second threshold value, the controller changes the display mode of the portion of the virtual image based on the vibration information.

An information presentation system according to another aspect of the present disclosure includes the display system, and a detection system which detects the vibration applied to the display unit. The vibration information obtaining unit obtains the vibration information from the detection system.

A control method according to another aspect of the present disclosure is a method for controlling a display system which projects an image to be viewed by a target person as if a virtual image is being projected onto the target space. The display system includes a display unit, a controller, and a vibration information obtaining unit which obtains vibration information. The display unit displays the image. The controller controls the display of the display unit. The vibration information obtaining unit obtains the vibration information about vibration applied to the display unit. When the vibration exceeds a first threshold value and the viewing distance of a portion of the virtual image exceeds a second threshold value, the method for controlling the display system causes the controller to change the display mode of the virtual image based on the vibration information.

A program according to another aspect of the present disclosure is a program for causing a computer system to execute the method for controlling the display system.

A mobile body according to another aspect of the present disclosure includes: the display system; and a reflection member which has light transmitting properties and reflects the light emitted from the display unit so that the virtual image is viewed by the target person.

According to the present disclosure, it is possible to provide a display system, an information presentation system, a method for controlling the display system, a program, and a mobile body which are capable of making the deviation of the display position of a virtual image less noticeable.

DESCRIPTION OF EMBODIMENTS

Prior to the description of an embodiment of the present invention, problems in a conventional system will be briefly described. In the dangerous situation warning device described in PTL 1, when vibration occurs in a vehicle equipped with the dangerous situation warning device, the position of the red frame (virtual image) displayed by the warning output device (display system) varies due to the vibration of the vehicle. This may result in deviation of the display positions of the obstacle and the red frame.

EMBODIMENT

(1) Overview

Figure 1:
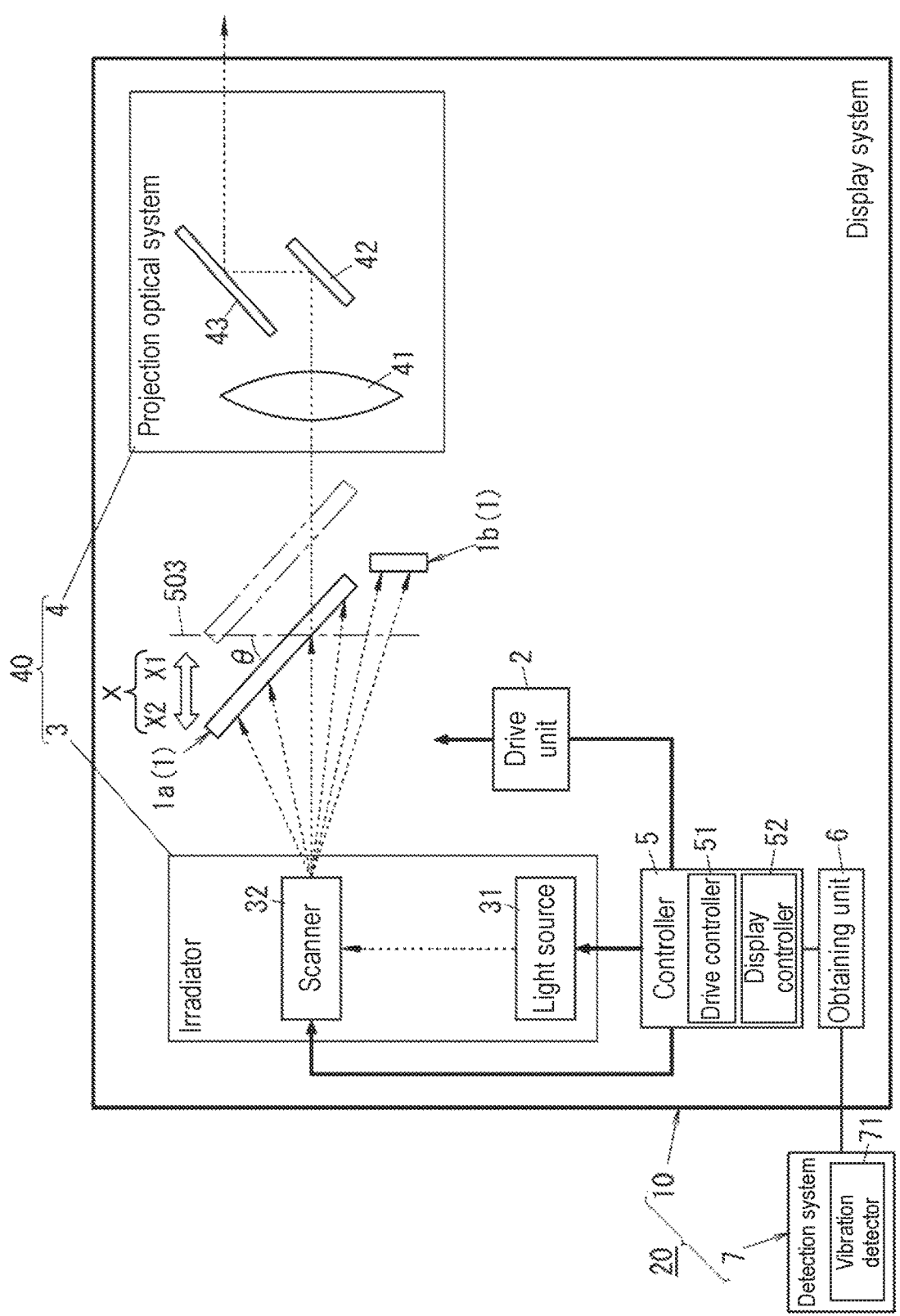
FIG. 1 is a conceptual diagram of a configuration of an information presentation system according to an embodiment of the present disclosure.

As illustrated in FIG. 1, display system 10 according to the present embodiment includes display unit 40 which displays (projects) a virtual image in a target space, vibration information obtaining unit 6 which obtains vibration information about vibration applied to display unit 40, and controller 5 which controls display unit 40. Obtaining unit 6, display unit 40, and controller 5 will be described in detail in "(2) Configuration".

Figure 2:
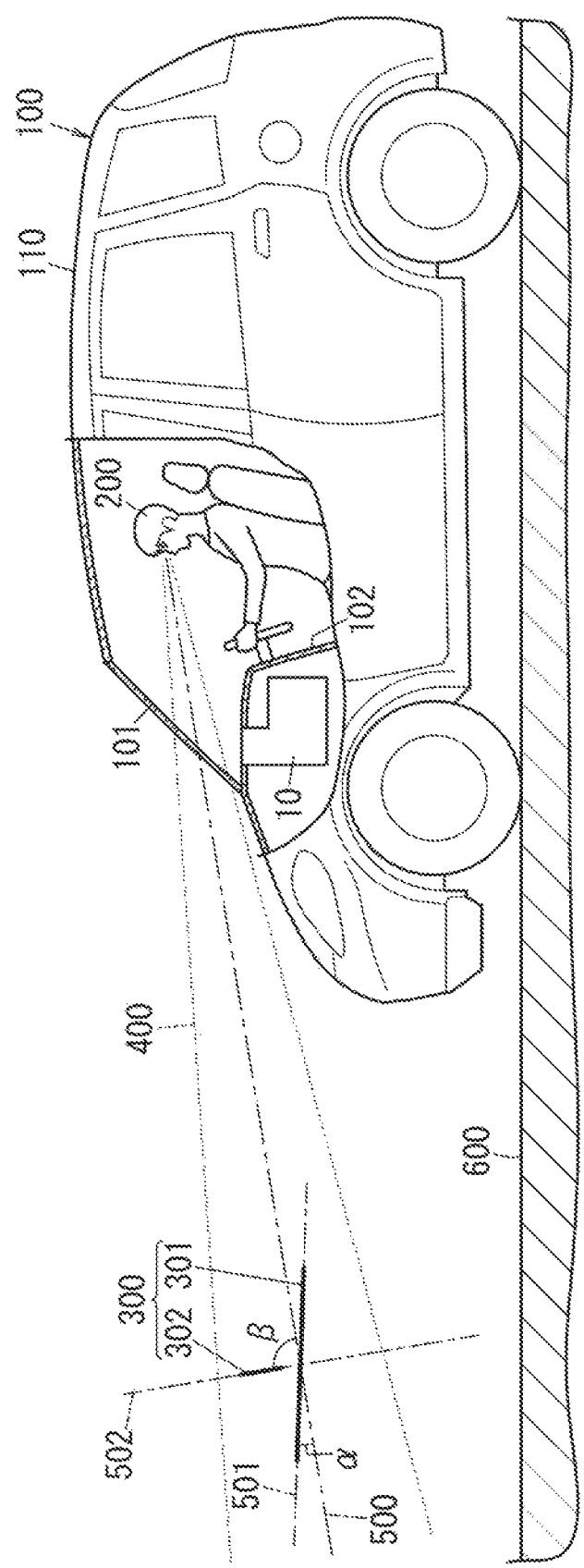
FIG. 2 is a conceptual diagram of a vehicle which includes a display system according to an embodiment of the present disclosure.

As illustrated in FIG. 2, display system 10 according to the present embodiment is a head-up display (HUD) for use in vehicle 100 as a mobile body, for example. Display system 10 is disposed in a cabin of vehicle 100 to project an image onto windshield 101 (reflection member) of vehicle 100 from below. In the example illustrated in FIG. 2, display system 10 is disposed in dashboard 102 installed below windshield 101. When an image is projected from display system 10 onto windshield 101, the image reflected on windshield 101 as the reflection member is viewed by user 200 (driver).

According to display system 10 as described, user 200 recognizes visually that virtual image 300 looks like being projected onto target space 400 set in front of vehicle 100 (outside of the vehicle). Here, the term "front" refers to a direction in which vehicle 100 moves forward, and a direction in which vehicle 100 moves forward or backward is referred to as a longitudinal direction. The term "virtual image" means an image formed by a radiated ray as if an object were actually presented when light emitted from display system 10 is radiated by a reflecting object such as windshield 101. Since windshield 101 has light transmitting properties, user 200, as a target person, is capable of viewing target space 400 in front of vehicle 100 through windshield 101. Therefore, user 200 is capable of viewing virtual image 300 which is projected by display system 10, while superimposing virtual image 300 on a real space spreading in front of vehicle 100. Hence, according to display system 10, various pieces of driving assistance information, such as vehicle speed information, navigation information, pedestrian information, front vehicle information, lane departure information and vehicle condition information, can be displayed as virtual image 300 to be viewed by user 200. In this manner, user 200 is capable of visually obtaining the driving assistance information by only a slight movement of a line of sight from a state of directing the line of sight forward of windshield 101.

In display system 10 according to the present embodiment, virtual image 300 formed in target space 400 includes at least two types of virtual images, i.e., first virtual image 301 and second virtual image 302. The term "first virtual image" mentioned herein is virtual image 300 (301) formed on first virtual plane 501. The term "first virtual plane" is a virtual plane in which inclination angle α with respect to optical axis 500 of display system 10 is smaller than predetermined value γ (α<γ). Moreover, the term "second virtual image" mentioned herein is virtual image 300 (302) formed on second virtual plane 502. The term "second virtual plane" is a virtual plane in which inclination angle ß with respect to optical axis 500 of display system 10 is larger than predetermined value γ (ß>γ). The "optical axis" mentioned herein is an optical axis of an optical system of projection optical system 4 (see FIG. 1) to be described later, that is, an axis that passes through a center of target space 400 and goes along an optical path of virtual image 300. An example of predetermined value γ is 45 degrees, and an example of inclination angle ß is 90 degrees.

In display system 10 according to the present embodiment, virtual image 300 formed in target space 400 includes third virtual image 303 (see FIG. 3) in addition to first virtual image 301 and second virtual image 302. The term "third virtual image" is, similarly to second virtual image 302, virtual image 300 (303) formed on second virtual plane 502 in which inclination angle ß with respect to optical axis 500 is larger than predetermined value γ. In virtual image 300 formed on second virtual plane 502, a virtual image formed by light penetrating movable screen 1a is second virtual image 302, and a virtual image formed by light penetrating fixed screen 1b is third virtual image 303, as details will be described later.

In the present embodiment, optical axis 500 is along road surface 600 in front of vehicle 100 in target space 400 in front of vehicle 100. Then, first virtual image 301 is formed on first virtual plane 501 substantially parallel to road surface 600, and second virtual image 302 and third virtual image 303 are formed on second virtual plane 502 substantially perpendicular to road surface 600. For example, when road surface 600 is a horizontal plane, first virtual image 301 is displayed along the horizontal plane, and second virtual image 302 and third virtual image 303 are displayed along a vertical plane.

Figure 3:
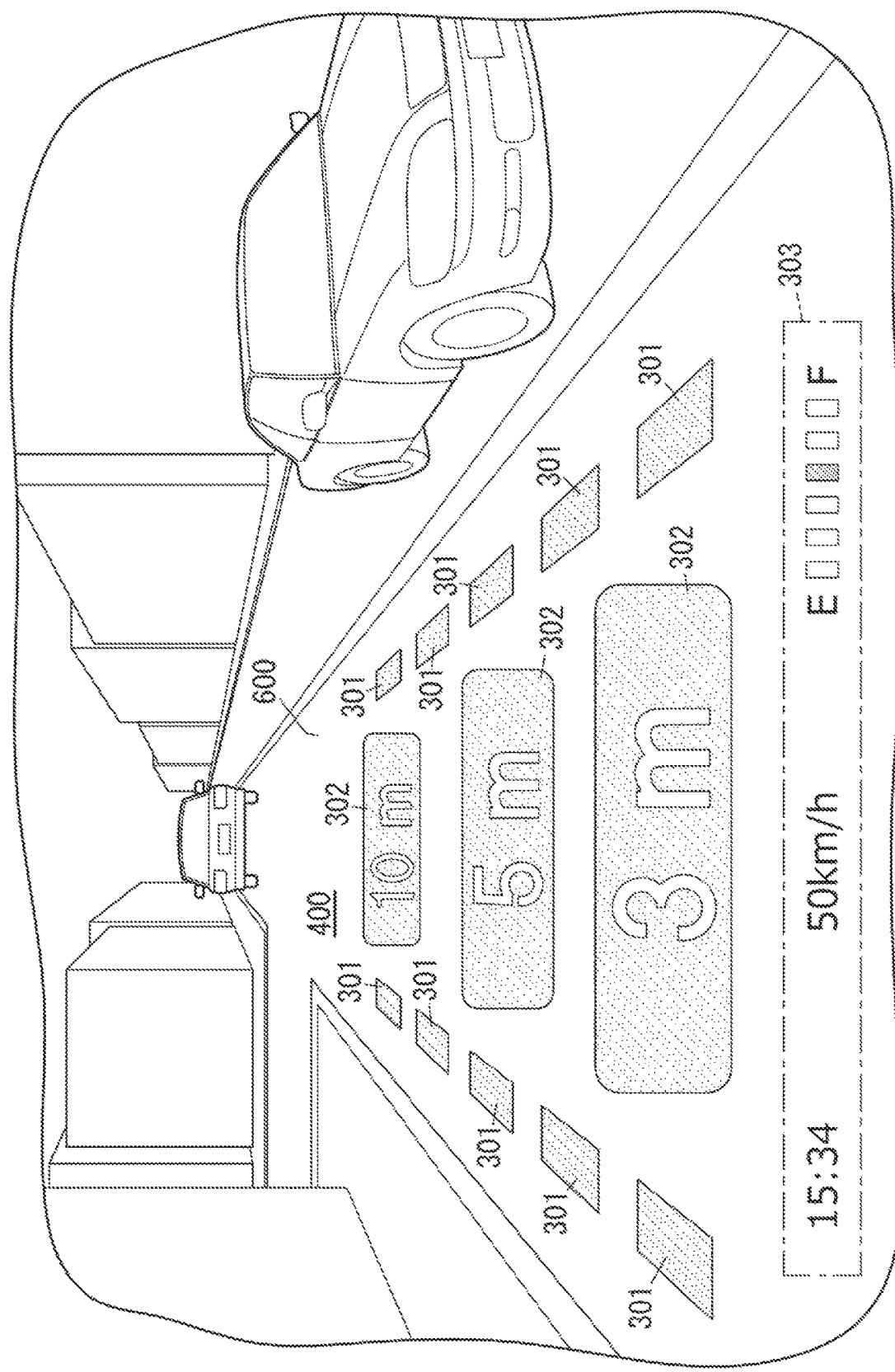
FIG. 3 is a conceptual diagram of a display example in the information presentation system.

FIG. 3 is a conceptual diagram of a visual field of user 200. As illustrated in FIG. 3, display system 10 according to the present embodiment is capable of displaying first virtual images 301 viewed with depth along road surface 600 and second virtual images 302 and third virtual image 303 viewed vertically on road surface 600 at a fixed distance from user 200. Hence, for user 200, each first virtual image 301 looks like being presented on a plane substantially parallel to road surface 600, and each second virtual image 302 and third virtual image 303 look like being presented on a plane substantially perpendicular to road surface 600. An example of first virtual image 301 is navigation information indicating a traveling direction of vehicle 100, which can present an arrow that indicates to turn right or turn left on road surface 600. An example of second virtual image 302 is information indicating a distance to a front vehicle or a pedestrian, which can present a distance to the front vehicle (inter-vehicle distance) on the front vehicle. An example of third virtual image 303 is a current time, vehicle speed information, and vehicle condition information, which can present these pieces of information, for example, by letters, numbers, and symbols, or a meter such as a fuel gauge.

(2) Configuration

As illustrated in FIG. 1, display system 10 according to the present embodiment includes a plurality of screens 1a and 1b, drive unit 2, irradiator 3, projection optical system 4, controller 5, and obtaining unit 6. According to the present embodiment, projection optical system 4 with irradiator 3 form display unit 40 that projects (displays) virtual image 300 (see FIG. 2) onto target space 400 (see FIG. 2).

Further, information presentation system 20 according to the present embodiment includes display system 10 and detection system 7.

A plurality of screens 1a and 1b include fixed screen 1b and movable screen 1a. Fixed screen 1b is fixed to a fixed position of a housing or the like of display system 10. Movable screen 1a is inclined at angle θ with respect to reference plane 503. Moreover, movable screen 1a is configured to be movable in movement directions X orthogonal to reference plane 503. The term "reference plane" mentioned herein is not a real plane but a virtual flat plane that defines the movement direction of movable screen 1a. Movable screen 1a is configured to be movable rectilinearly in movement directions X (directions shown by an arrow X1-X2 in FIG. 1) while maintaining the orientation inclined at angle θ with respect to reference plane 503. In the case where movable screen 1a and fixed screen 1b are not particularly distinguished from one another, each of the plurality of screens 1a and 1b may be referred to as "screen 1" hereinafter.

Screen 1 (each of movable screen 1a and fixed screen 1b) has translucency and forms an image to form virtual image 300 (see FIG. 2) in target space 400 (see FIG. 2). In other words, an image is drawn on screen 1 by light from irradiator 3, and virtual image 300 is formed in target space 400 by the light penetrating screen 1. Screen 1 is made of, for example, a plate-shaped member that has light diffusing properties and is formed into a rectangular shape. Screen 1 is disposed between irradiator 3 and projection optical system 4.

Drive unit 2 moves movable screen 1a in movement directions X. Here, drive unit 2 is capable of moving movable screen 1a both in a direction toward and away from projection optical system 4 along movement directions X. For example, drive unit 2 is made of an electric driven actuator, such as a voice coil motor, and operates according to a first control signal output from controller 5.

Irradiator 3 is a scanning photoirradiation unit, and irradiates movable screen 1a or fixed screen 1b with light. Irradiator 3 includes light source 31 and scanner 32. In irradiator 3, each of light source 31 and scanner 32 operates according to a second control signal output from controller 5.

Light source 31 is formed of a laser module that outputs laser light. Light source 31 includes a red laser diode that emits a laser light beam of a red color (R), a green laser diode that emits a laser light beam of a green color (G), and a blue laser diode that emits a laser light beam of a blue color (B). Three color laser light beams output from these three kinds of laser diodes are synthesized by, for example, a dichroic mirror, and incident on scanner 32.

Scanner 32 irradiates movable screen 1a or fixed screen 1b with light that scans on one side of movable screen 1a or fixed screen 1b by scanning the light from light source 31. Here, scanner 32 executes raster scan in which light is scanned two-dimensionally on one side of movable screen 1a or fixed screen 1b.

The light, as incident light, that is output from irradiator 3 and that penetrates screen 1 is incident on projection optical system 4. Projection optical system 4 projects virtual image 300 (see FIG. 2) onto target space 400 (see FIG. 2) with the incident light. Projection optical system 4 is arranged in line in movement directions X of movable screen 1a with respect to screen 1. As illustrated in FIG. 1, projection optical system 4 includes magnifying lens 41, first mirror 42, and second mirror 43.

Magnifying lens 41, first mirror 42, and second mirror 43 are arranged in this order on a route of the light penetrating screen 1. Magnifying lens 41 is disposed on an opposite side to irradiator 3 (a side indicated by first direction X1) in movement directions X as seen from screen 1 so that the light output from screen 1 in movement directions X is incident on magnifying lens 41. Magnifying lens 41 magnifies an image formed on screen 1 by the light emitted from irradiator 3 to output the image to first mirror 42. First mirror 42 reflects the light from magnifying lens 41 toward second mirror 43. Second mirror 43 reflects the light, which is emitted from first mirror 42, toward windshield 101 (see FIG. 2). That is, projection optical system 4 magnifies the image formed on screen 1 by the light emitted from irradiator 3 with magnifying lens 41 and projects the image onto windshield 101, thereby projecting virtual image 300 onto target space 400. An optical axis of magnifying lens 41 corresponds to optical axis 500 of projection optical system 4.

Obtaining unit 6 obtains, from detection system 7, vibration information about vibration applied to main body 110 of vehicle 100, that is, vibration information about vibration applied to display unit 40 mounted on main body 110. Obtaining unit 6 also obtains the detection information of a detection object that exists in target space 400, information concerning a position of vehicle 100 (also referred to as "position information"), and information concerning a state of vehicle 100 (also referred to as "vehicle information"). An example of the detection object mentioned herein is an object with which vehicle 100 may collide, in objects that exist in target space 400. Examples of this kind of object include a movable object, such as a person, an animal, a bicycle, a vehicle, a motorcycle, a wheelchair, and a stroller, and a fixed object, such as a traffic signal, a street light, and a utility pole, or a mobile object, such as an obstacle which exist in target space 400.

Detection system 7 includes vibration detector 71 which detects vibration applied to the main body of vehicle 100. Vibration detector 71 includes, for example, a gyroscope sensor or an inclination sensor which detects an orientation (inclination) of main body 110 of vehicle 100. Vibration detector 71 detects, based on an output from the gyroscope sensor or the inclination sensor, vibration applied to main body 110 (that is, display unit 40) from a change over time in the orientation of main body 110 during a predetermined period (for example, one to a few seconds). In other words, vibration detector 71 detects the amount of change in orientation (for example, inclination angle) of main body 110 during a predetermined period, as a magnitude of vibration applied to display unit 40 (for example, amplitude). Vibration detector 71 then outputs, to display system 10, the detection value of the magnitude of the vibration as vibration information about vibration applied to display unit 40. Controller 5 may obtain the amplitude of vibration from the amount of change in orientation (inclination angle) of main body 110 during a predetermined period, and output, to display system 10, an average value, a maximum value, a minimum value, a medium value or the like of the amplitude during a predetermined period as vibration information.

Note that vibration detector 71 is not limited to the one which includes a gyroscope sensor or an inclination sensor which detects the orientation (inclination) of main body 110. The configuration of vibration detector 71 may be appropriately changed as long as the vibration applied to display unit 40 can be detected. For example, vibration detector 71 may include an acceleration sensor which detects acceleration applied to main body 110, and may detect vibration applied to display unit 40 based on an output value of the acceleration sensor. Moreover, vibration detector 71 may include a piezoelectric vibration sensor to detect vibration applied to display unit 40 from an output of the vibration sensor.

Moreover, detection system 7 includes at least one sensor among, for example, a camera, a light detection and ranging (LiDAR), a sonar sensor, and a radar, and detects a detection object which exists around vehicle 100 (own vehicle). Detection system 7 obtains information, such as a distance from vehicle 100 to a detection object, a relative coordinate of the detection object to vehicle 100, or a relative velocity between the detection object and vehicle 100, as detection information about the detection object.

Detection system 7 also obtains a current position of vehicle 100 using, for example, a global positioning system (GPS) to detect the position information concerning the position of vehicle 100 based on the current position of vehicle 100. Detection system 7 obtains map information of a neighborhood of the current position based on the current position of vehicle 100. Detection system 7 may obtain the map information of the neighborhood of the current position from a memory storing map information, or obtain the map information from an external server by a mobile communicator included in detection system 7 or vehicle 100 communicating with the external server. The position information mentioned herein is, for example, information of a road (traffic route) on which vehicle 100 currently travels. The position information is, for example, information such as the number of lanes on the road, width of a roadway, presence or absence of a sidewalk, a gradient, a curvature of a curve, presence or absence of a sidewalk, information as to whether a current position is an intersection (intersection such as a crossroad or a T-junction) or not, or information as to whether the road is one way or not.

Detection system 7 may also obtain the vehicle information concerning a state of vehicle 100 from an advanced driver assistance system (ADAS) or the like. The vehicle information is information indicating the local state of vehicle 100 itself, and the information detectable by a sensor installed on vehicle 100. Specific examples of the vehicle information include travelling speed (running speed) of vehicle 100, acceleration applied to vehicle 100, depression amount of an accelerator pedal (degree of accelerator opening), depression amount of a brake pedal, a steering angle, or a driver's pulse, an expression and a line of sight detected by a driver monitor. Specific data of vehicle 100, such as vehicle width, vehicle height, overall vehicle length, and eye point, is also included in the vehicle information.

Vibration detector 71 included in detection system 7 may be shared with the advanced driver assistance system.

Controller 5 is composed of a microcomputer mainly including, for example, a central processing unit (CPU) and a memory. In other words, controller 5 is realized by a computer including the CPU and the memory. The CPU executes a program stored in the memory, allowing the computer to function as controller 5. Herein, the program is recorded in the memory of controller 5 in advance. However, the program may be provided via a telecommunication line such as the Internet or by being recorded in a (non-transitory) recording medium such as a memory card.

Controller 5 controls display of display unit 40 by controlling drive unit 2 and irradiator 3. Controller 5 controls drive unit 2 with a first control signal, and controls irradiator 3 with a second control signal. Controller 5 synchronizes operation of drive unit 2 with operation of irradiator 3. Controller 5 further functions as drive controller 51 and display controller 52 as illustrated in FIG. 1.

Drive controller 51 relatively moves movable screen 1a with respect to a reference position by controlling drive unit 2. The "reference position" mentioned herein is a position provided at a prescribed position in a movement area of movable screen 1a. Drive controller 51 moves movable screen 1a in order to project second virtual image 302 onto target space 400 by the light penetrating movable screen 1a. Drive controller 51 controls drive unit 2 by synchronizing with drawing on movable screen 1a by irradiator 3.

Display controller 52 determines content of virtual image 300 projected onto target space 400 by display unit 40 and a viewing distance in which virtual image 300 is projected, based on the detection information, position information and vehicle information obtained by obtaining unit 6. Here, the viewing distance in which virtual image 300 is projected refers to a distance from an eye (eye point) of user 200 to virtual image 300. In the case of first virtual image 301 displayed along first virtual plane 501 substantially parallel to road surface 600, the viewing distance in first virtual image 301 is different between the part farthest from the eye of user 200 and the part nearest to the eye of user 200. Obtaining unit 6 may obtain at least one of the detection information, the position information, and the vehicle information, and display controller 52 may determine the content and viewing distance of virtual image 300 based on the information obtained by obtaining unit 6 among the detection information, the position information, and the vehicle information.

Display controller 52 changes, based on the vibration information obtained by obtaining unit 6, the display mode of virtual image 300 displayed by display unit 40, when the vibration applied to display unit 40 exceeds a predetermined first threshold value and the viewing distance of a portion of virtual image 300 (including first virtual image 301 or second virtual image 302) exceeds a second threshold value. For example, when main body 110 of vehicle 100 vibrates due to the unevenness or the like of road surface 600, display unit 40 vibrates according to the vibration of main body 110. This causes blurring in virtual image 300 projected onto target space 400 by display unit 40. Such blurring of virtual image 300 becomes more noticeable as the viewing distance from user 200 to virtual image 300 increases. When virtual image 300 is displayed at a position overlapping or corresponding to an object which exists in the real space, if the blurring of virtual image 300 increases, the positions of virtual image 300 and the object existing in the real space deviate, and display system 10 may fail to perform intended display. Therefore, when the vibration applied to display unit 40 exceeds the predetermined first threshold value and the viewing distance of the portion of virtual image 300 exceeds the second threshold value, display controller 52 changes the display mode of virtual image 300 so as to make blurring of the display position of virtual image 300 caused by the vibration less noticeable.

Here, changing of the display mode of virtual image 300 means visually changing of virtual image 300 projected onto target space 400, and means changing of the state of virtual image 300 viewed by user 200. In the present embodiment, display controller 52 changes the display mode of virtual image 300 by changing one or more of the transmittance, the size, the shape, the color, the outline, and the like of virtual image 300. Further, the vibration applied to display unit 40 is, for example, a vibration generated when main body 110 of vehicle 100 swings (pitching) around the left and right axes, and a vibration generated due to, for example, a road undulation or unevenness of the road surface. In the case of vehicle 100, such a vibration is, for example, low frequency vibration constantly generated in a cycle of around 1 Hz. The first threshold value is a threshold value set in advance for the vibration applied to display unit 40. The first threshold value is, for example, a threshold value for the change over time in the magnitude (for example, amplitude) of the vibration, and is set to a value corresponding to the change over time when the pitch angle of main body 110 changes in the range of ±0.5 degrees. The second threshold value is a threshold value set in advance for the viewing distance of virtual image 300, and may be set to a distance at which the blurring of virtual image 300 is easily noticeable due to the vibration. The second threshold value may be set to a distance of, for example, about 50 meters to 100 meters, and is set to 50 meters in the present embodiment.

(3) Operation

Hereinafter, a basic operation of information presentation system 20 (display system 10) according to the present embodiment will be described. Controller 5 causes irradiator 3 to irradiate movable screen 1a with light. At this time, irradiator 3 emits light scanning on one side of movable screen 1a. Accordingly, an image is formed on (projected onto) movable screen 1a. Moreover, the light from irradiator 3 penetrates movable screen 1a, and is emitted to windshield 101 from projection optical system 4. In this manner, the image formed on movable screen 1a is projected onto windshield 101 from below windshield 101 in the cabin of vehicle 100.

When the image is projected from projection optical system 4 onto windshield 101, windshield 101 reflects the light from projection optical system 4 toward user 200 (driver) in the cabin. Accordingly, the image reflected by windshield 101 is viewed by user 200. It looks like virtual image 300 (first virtual image 301 or second virtual image 302) is being projected in front of vehicle 100 (outside of the vehicle) for user 200. As a result, virtual image 300 (first virtual image 301 or second virtual image 302) projected in front of vehicle 100 (outside of the vehicle) is viewed by user 200, as if virtual image 300 is being viewed through windshield 101.

Specifically, controller 5 scans the light on one side of movable screen 1a in a state where movable screen 1a is fixed in movement directions X, so that first virtual image 301 viewed with depth along road surface 600 is formed. Moreover, controller 5 scans the light on one side of movable screen 1a, while moving movable screen 1a so that a distance in directions X between a luminescent spot on one side of movable screen 1a and projection optical system 4 is kept constant. Consequently, second virtual image 302, which is viewed vertically on road surface 600 that is positioned at a fixed distance from user 200, is formed.

Here, while irradiator 3 irradiates movable screen 1a with light, drive controller 51 of controller 5 causes drive unit 2 to move movable screen 1a in movement directions X. In the case where an irradiation position on one side of movable screen 1a on which the light is emitted from irradiator 3, that is, a position of the luminescent spot is constant, when movable screen 1a moves in first direction X1, the distance from an eye (eye point) of user 200 to virtual image 300 (also referred to as "viewing distance") becomes shorter. In contrast, in the case where the position of the luminescent spot on one side of movable screen 1a is constant, when movable screen 1a moves in second direction X2, the viewing distance to virtual image 300 becomes longer (more distant). In other words, the viewing distance to virtual image 300 changes according to the position of movable screen 1a in movement directions X.

For example, in the case where the viewing distance of first virtual image 301 is to be changed, controller 5 moves movable screen 1a in directions X according to the viewing distance. In the state where movable screen 1a is fixed at a position after the movement, the light is scanned on one side of movable screen 1a. In the case where the viewing distance of second virtual image 302 is to be changed, controller 5 moves movable screen 1a in directions X according to the viewing distance. Controller 5 scans the light on one side of movable screen 1a, while moving movable screen 1a so that the distance in directions X between the luminescent spot and projection optical system 4 is kept constant based on the position after the movement.

Controller 5 also causes irradiator 3 to irradiate fixed screen 1b with light. At this moment, irradiator 3 emits, to fixed screen 1b, light scanning on one side of fixed screen 1b. Accordingly, similarly to the case where movable screen 1a is irradiated with light, an image is formed on (projected onto) fixed screen 1b and the image is projected onto windshield 101. As a result, user 200 is capable of viewing virtual image 300 (third virtual image 303), which is projected in front of vehicle 100 (outside of the vehicle), through windshield 101. Since third virtual image 303 is formed by the light projected onto fixed screen 1b whose position is fixed, third virtual image 303 is viewed vertically at a predetermined distance (for example, two to three meters) from user 200 on road surface 600.

Display system 10 according to the present embodiment is capable of projecting all of first virtual image 301, second virtual image 302, and third virtual image 303 during one cycle in which scanner 32 makes one round trip in a longitudinal direction of movable screen 1a (in an inclined direction with respect to reference plane 503 of movable screen 1a). Specifically, on "outward way" in which the light is scanned on movable screen 1a and fixed screen 1b in this order, at first, display unit 40 emits light to movable screen 1a to project first virtual image 301, and then emits light to fixed screen 1b to display third virtual image 303. On "return way" in which the light is scanned on fixed screen 1b and movable screen 1a in this order, at first, display unit 40 emits light to fixed screen 1b to display third virtual image 303, and then emits light to movable screen 1a to project second virtual image 302.

Therefore, first virtual image 301, third virtual image 303, and second virtual image 302 are projected onto target space 400 during one cycle in which scanner 32 scans in the longitudinal direction. Scanning in the longitudinal direction is performed in irradiator 3 relatively fast, so that user 200 recognizes visually that first virtual image 301, third virtual image 303, and second virtual image 302 look like being displayed simultaneously. Frequency of scanning in the longitudinal direction in irradiator 3 is, for example, greater than or equal to 60 Hz.

Figure 4:
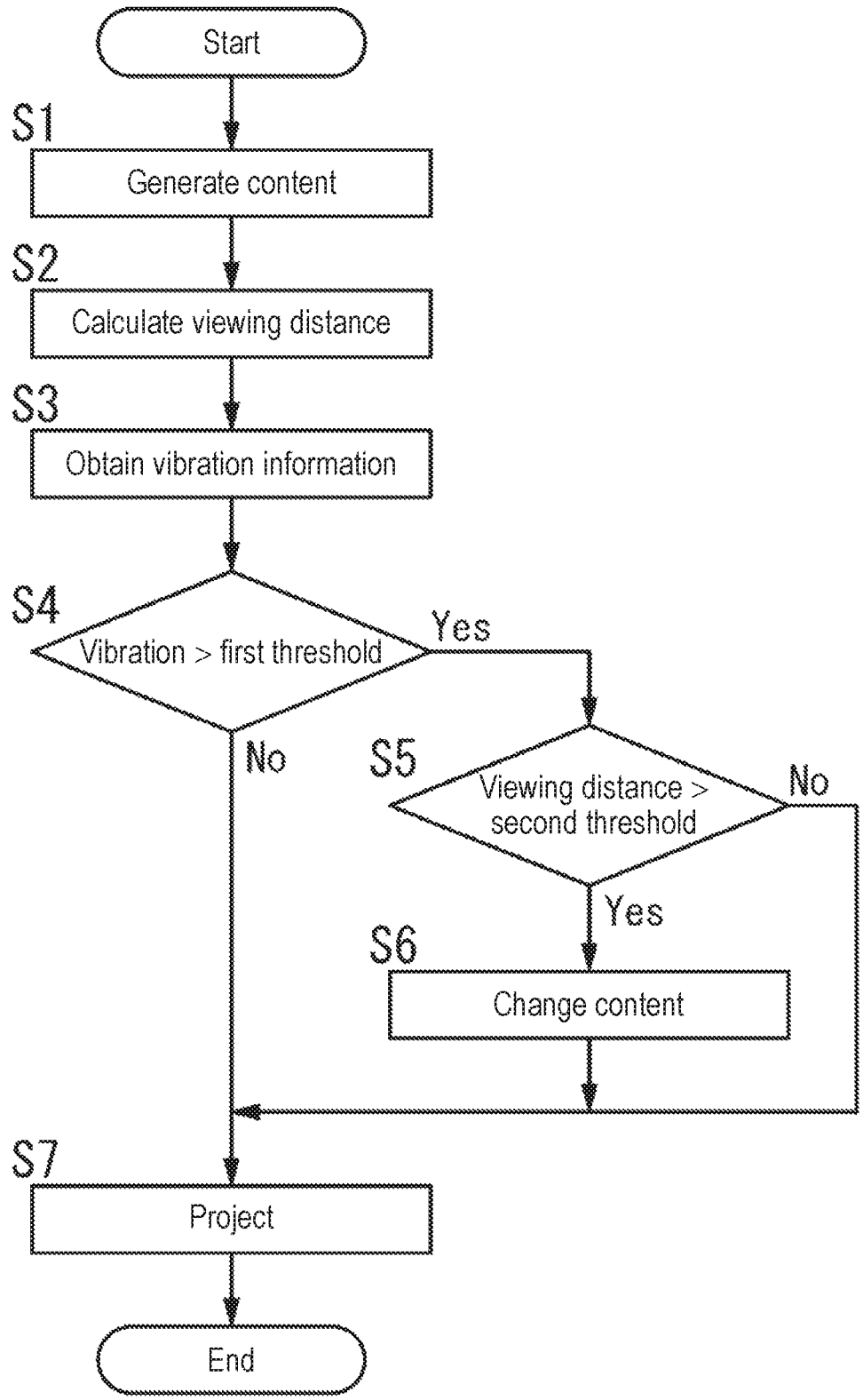
FIG. 4 is a flowchart of an operation of the information presentation system.

With reference to FIG. 4, an operation of information presentation system 20 according to the present embodiment, which is executed for changing the display mode of a virtual image based on the vibration information detected by detection system 7, will be described hereinafter.

When user 200, as a driver of vehicle 100, operates an ignition switch or the like, electricity is supplied to information presentation system 20 (display system 10 and detection system 7), so that information presentation system 20 starts to be operated.

Obtaining unit 6 of display system 10 obtains, on a regular or irregular basis, from detection system 7, detection information of a detection objection present in target space 400, position information of vehicle 100, and vehicle information about the state of vehicle 100.

Display controller 52 generates content of virtual image 300 projected onto target space 400 by display unit 40, based on the detection information, position information and vehicle information obtained by obtaining unit 6 (S1), and calculates the viewing distance in which generated virtual image 300 is projected. Here, the viewing distance of each pixel in virtual image 300 can be calculated from the angle of view and positions of screens 1a and 1b, the irradiation position of light from irradiator 3, and the like (S2).

Obtaining unit 6 also obtains, from vibration detector 71 of detection system 7, vibration information about vibration applied to main body 110 of vehicle 100 that is vibration information about vibration applied to display unit 40 (S3).

Controller 5 compares the magnitude of the vibration with a first threshold value based on the vibration information obtained by obtaining unit 6 (S4).

When the change over time in the magnitude of the vibration is less than or equal to the first threshold value (S4: No), drive controller 51 of controller 5 controls drive unit 2 and irradiator 3 so that virtual image 300 generated in Step S1 is projected onto target space 400 by display unit 40 (S7).

When the change over time in the magnitude of the vibration exceeds the first threshold value (S4: Yes), controller 5 compares the magnitude of the viewing distance calculated in Step S2 with a second threshold value. For example, relative to the viewing distance, the viewing distance of each pixel forming the virtual image is compared with the second threshold value. In addition, relative to virtual image 301 or the like viewed vertically, the viewing distance of at least one pixel may be compared with the second threshold value. Moreover, relative to virtual image 301 viewed with depth, only a plurality of representative pixels may be compared with the second threshold value (S5).

If the viewing distance calculated in Step S2 is less than or equal to the second threshold value (S5: No), drive controller 51 of controller 5 controls drive unit 2 and irradiator 3 so that virtual image 300 generated in Step S1 is projected onto target space 400 by display unit 40 (S7).

In contrast, if the viewing distance calculated in Step S2 exceeds the second threshold value (S5: Yes), display controller 52 of controller 5 changes the content of virtual image 300 generated in Step S1 (S6).

Figure 5A:
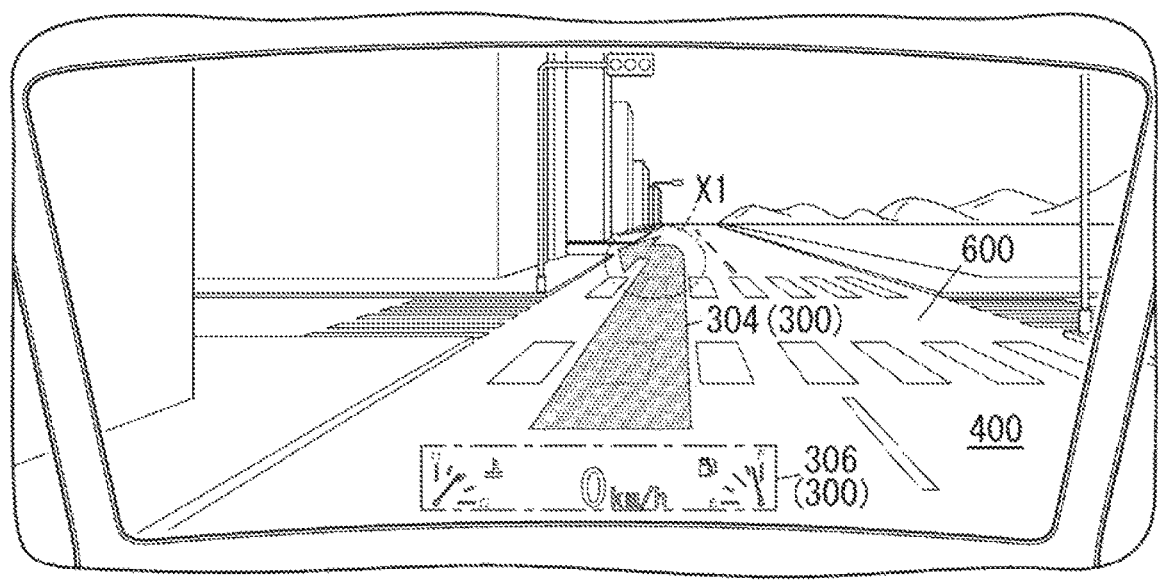
FIG. 5A is a conceptual diagram of a display example in the information presentation system.
Figure 5B:
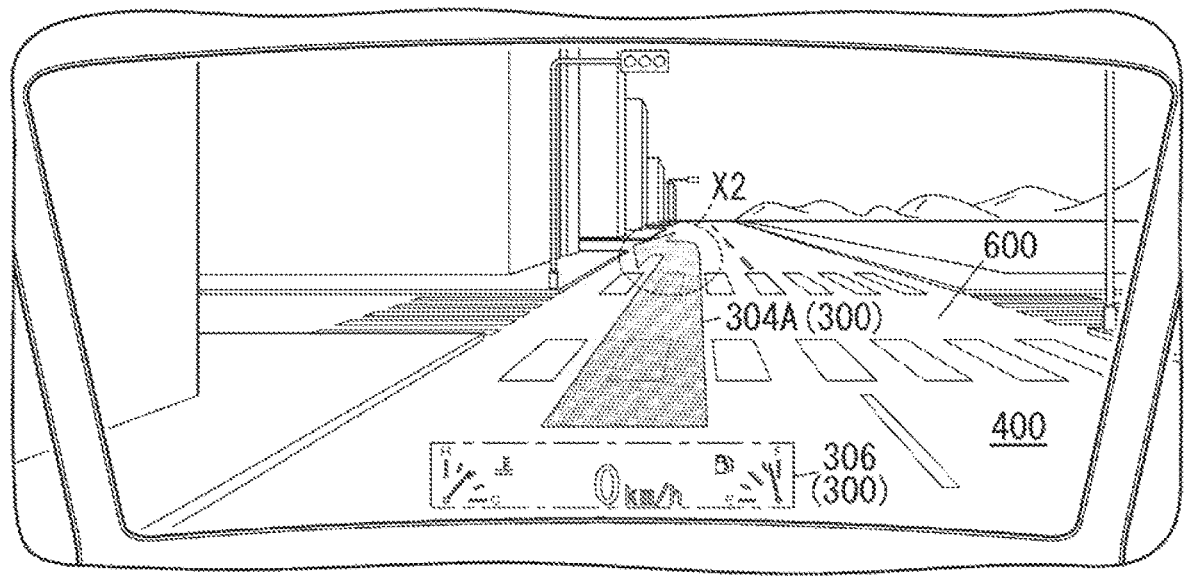
FIG. 5B is a conceptual diagram of a display example in the information presentation system.

For example, FIG. 5A is an example of virtual images 304 and 306 generated in Step S1. Virtual image 306 is third virtual image 303 for displaying vehicle information of vehicle 100 (own vehicle), and the viewing distance is several meters. Virtual image 304 is first virtual image 301 indicating the path of vehicle 100 (own vehicle). Virtual image 304 is virtual image 300 for instructing to turn left at the second intersection ahead, and the viewing distance of the top portion of virtual image 304 is, for example, 80 meters. Since the viewing distance of virtual image 306 is less than or equal to the second threshold value, controller 5 causes display unit 40 to project virtual image 306 onto target space 400 without changing the content. In contrast, since the viewing distance of the pixels of the top portion (X1 portion in FIG. 5A) of virtual image 304 exceeds the second threshold value, display controller 52 changes the display mode of the pixels of the top portion of virtual image 304 having a viewing distance exceeding the second threshold value. In the example of FIG. 5B, display controller 52 changes the content of virtual image 304 so as to reduce the transmittance of the top portion of virtual image 304. Accordingly, the visibility of the top portion (X2 portion in FIG. 5B) of virtual image 304A after the change is reduced compared with the top portion of virtual image 304 before the change, and is reduced also compared with portions of virtual image 304A after the change other than the top portion. Therefore, even if the display position of virtual image 304A is blurred due to the vibration applied to display unit 40, user 200 is unlikely to notice the blurring of virtual image 304A. As a result, it is possible to make the deviation of the display position of virtual image 304A less noticeable.

In this manner, when the display mode of virtual image 304 is changed, drive controller 51 of controller 5 controls drive unit 2 and irradiator 3 so that virtual image 304A having a display mode which has been changed in Step S6 is projected by display unit 40 onto target space 400 (S7).

Display system 10 projects virtual image 300 onto target space 400 by repeatedly executing the processing of Steps S1 to S7 described above at a predetermined time interval (for example, 1/60 seconds). Note that once the content of virtual image 304 is changed in Step S7, controller 5 only has to change the content of virtual image 304 back to the state before the change after the lapse of a predetermined period from when the vibration becomes less than or equal to the first threshold value or when the viewing distance becomes less than or equal to the second threshold value. This makes it difficult for the content of virtual image 304 to be frequently changed.

Note that the flowchart in FIG. 4 is an example, and the processing flow may be changed as appropriate. After the determinations in Step S4 and Step S5 are made, the content of virtual image 300 may be generated. Further, in the comparison of the two values in Step S4, whether or not the case where the two values are equal to each other is included can be arbitrarily changed depending on the setting of the first threshold value. Hence, controller 5 may be configured to determine whether or not the change over time in the magnitude of the vibration is greater than or equal to the first threshold value. In other words, controller 5 may be configured to determine whether or not the change over time in the magnitude of the vibration is less than the first threshold value. Similarly, in the comparison of two values in Step S4, controller 5 may be configured to determine whether or not the viewing distance is greater than or equal to the second threshold value. In other words, controller 5 may be configured to determine whether or not the viewing distance is less than the second threshold value.

Moreover, in the example of FIG. 5B, when the vibration applied to display unit 40 exceeds the first threshold value, display controller 52 reduces the transmittance of the portion of virtual image 304 having a viewing distance which exceeds the second threshold value. However, the change of the display mode is not limited to reduction of the transmittance. Display controller 52 may change the display mode of virtual image 300 by changing one or more of the transmittance, the size, the shape, the color, the outline, and the like of virtual image 304 (300).

Figure 6A:
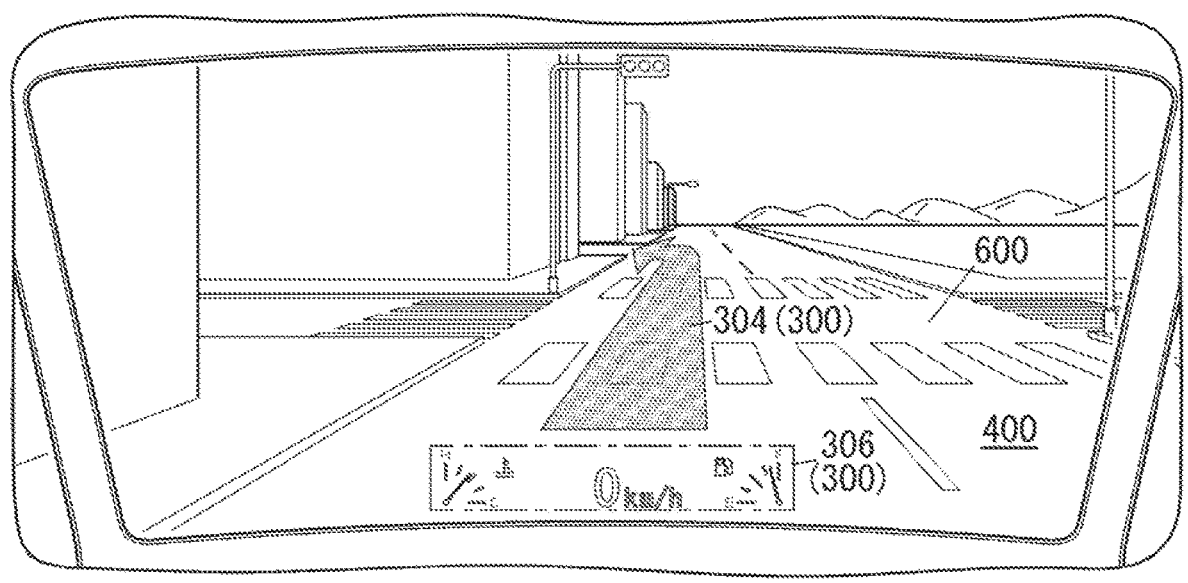
FIG. 6A is a conceptual diagram of another display example in the information presentation system.
Figure 6B:
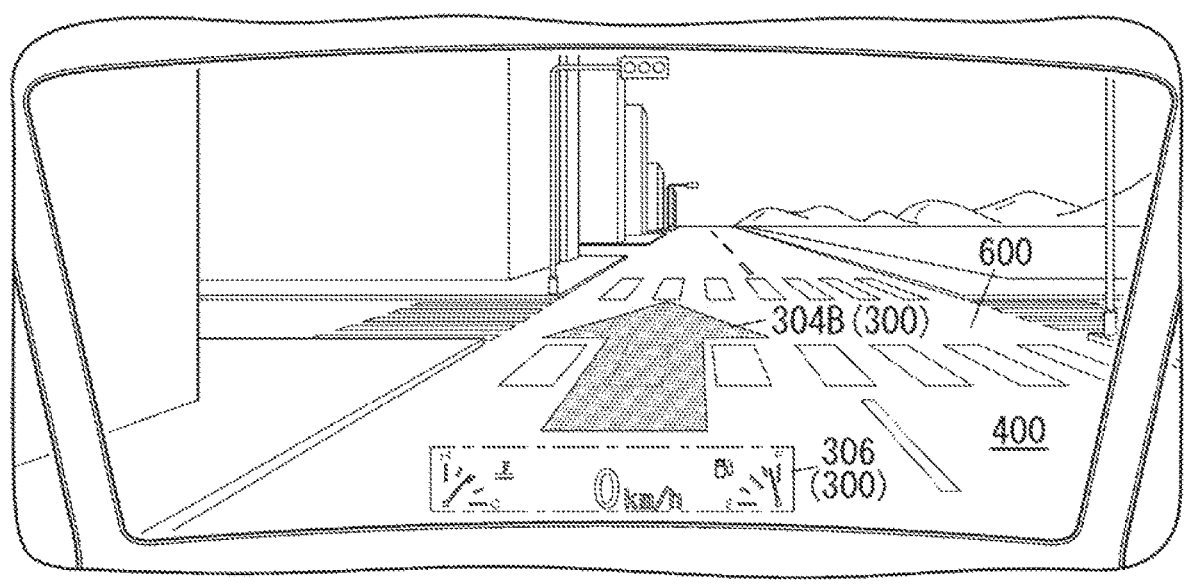
FIG. 6B is a conceptual diagram of another display example in the information presentation system.

For example, when the vibration exceeds the first threshold value and the viewing distance exceeds the second threshold value in the state where display unit 40 projects virtual image 304 onto target space 400 as illustrated in FIG. 6A, display controller 52 may change the shape of virtual image 304 so that blurring of virtual image 304 caused by the vibration becomes less noticeable. Specifically, display controller 52 displays, in target space 400, virtual image 304B (see FIG. 6B) having a shape changed so that the viewing distance becomes less than or equal to the second threshold value. Since virtual image 304 before the change is a virtual image instructing to turn left at the second intersection ahead, the viewing distance of the top portion of virtual image 304 is about 80 meters and exceeds the second threshold value. In contrast, virtual image 304B after the change is a virtual image instructing to go straight at the first intersection ahead, and the viewing distance of the top portion of virtual image 304B is less than the second threshold value. As a result, even when the vibration applied to display unit 40 exceeds the first threshold value, blurring of virtual image 304B becomes less noticeable and the deviation of the display position of virtual image 304B becomes less noticeable.

Figure 7A:
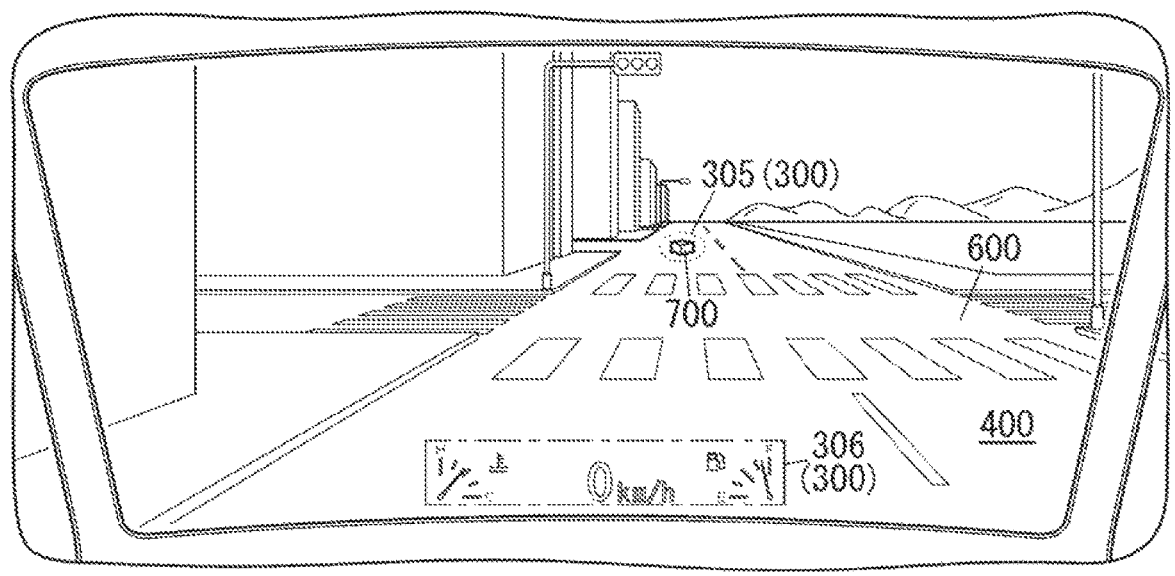
FIG. 7A is a conceptual diagram of another display example in the information presentation system.
Figure 7B:
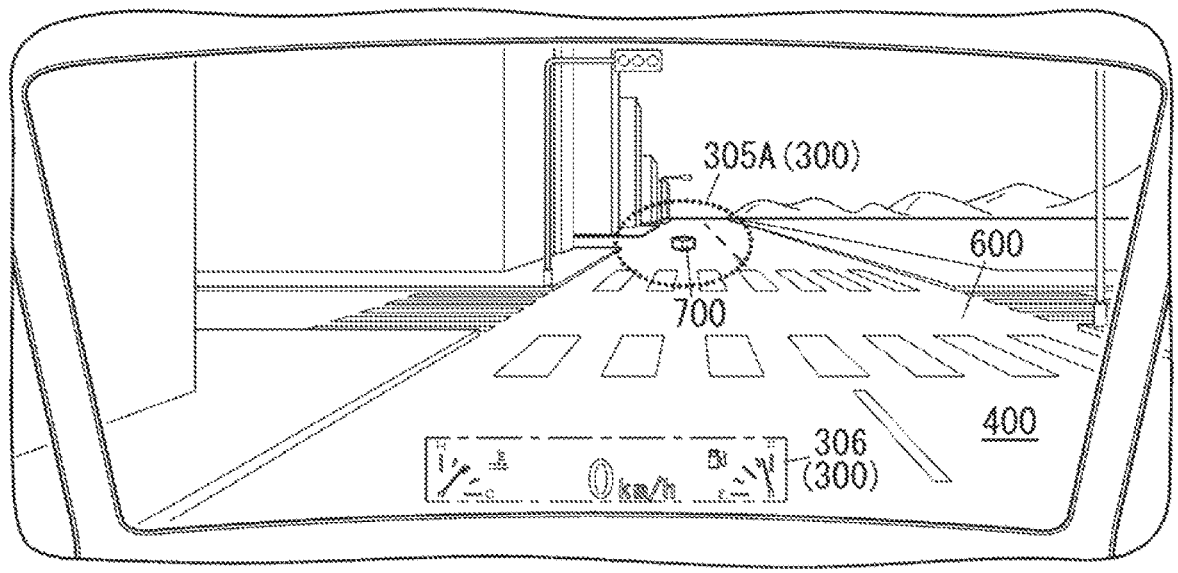
FIG. 7B is a conceptual diagram of another display example in the information presentation system.

In addition, when the vibration exceeds the first threshold value and the viewing distance of virtual image 300 exceeds the second threshold value, controller 5 may change the size of virtual image 300 so that blurring of virtual image 300 caused by the vibration becomes less noticeable. For example, as illustrated in FIG. 7A, when the vibration exceeds the first threshold value and the viewing distance of virtual image 305 exceeds the second threshold value in the state where display unit 40 projects circular virtual image 305 surrounding obstacle 700 on road surface 600, controller 5 changes the size of virtual image 305. Specifically, as illustrated in FIG. 7B, display controller 52 makes the size of virtual image 305A after the change larger than the size of virtual image 305 before the change. As a result, the range surrounded by virtual image 305A increases, so that even if the position of virtual image 305A is blurred due to the vibration applied to display unit 40, the positions of virtual image 305A and obstacle 700 are unlikely to deviate, and the deviation of the display position of virtual image 305A becomes less noticeable. If the vibration exceeds the first threshold value and the viewing distance of virtual image 305 exceeds the second threshold value, display controller 52 may make the size of virtual image 305 smaller than that before the change. By reducing the size of virtual image 305, the virtual image after the change becomes less noticeable, and the deviation of the display position of the virtual image after the change becomes less noticeable.

Moreover, when the vibration applied to display unit 40 exceeds the first threshold value and the viewing distance of virtual image 300 exceeds the second threshold value, display controller 52 may change the color of the portion of virtual image 300 having a viewing distance exceeding the second threshold value into a color that is less noticeable than a portion of virtual image 300 having a viewing distance less than or equal to the second threshold value. Moreover, when the vibration applied to display unit 40 exceeds the first threshold value and the viewing distance of virtual image 300 exceeds the second threshold value, display controller 52 may change the depth of the color of the portion of virtual image 300 having a viewing distance exceeding the second threshold value into a less depth color compared with the portion having a viewing distance less than or equal to the second threshold value. Moreover, when the vibration applied to display unit 40 exceeds the first threshold value and the viewing distance of virtual image 300 exceeds the second threshold value, display controller 52 may blur the outline of the portion of virtual image 300 having a viewing distance exceeding the second threshold value or reduce the contrast of virtual image 300.

Display controller 52 may make virtual image 300 after the change less noticeable by combining and changing two or more of the transmittance, the size, the shape, the color, the outline, and the like of virtual image 300.

(4) Modifications

The embodiment described above is merely one of various embodiments of the present disclosure. The embodiment described above can be variously modified in accordance with a design, for example, as long as the object of the present disclosure can be achieved. The same function as display system 10 may be embodied by, for example, a method for controlling display system 10, a program, or a non-transitory recording medium storing a program. A method for controlling display system 10 according to an aspect is a method for controlling display system 10 that includes display unit 40 which displays virtual image 300 in target space 400, controller 5 which controls the display of display unit 40, and obtaining unit 6 which obtains vibration information about vibration applied to display unit 40. In the method for controlling display system 10 according to an aspect, when the vibration exceeds the first threshold value and the viewing distance of virtual image 300 exceeds the second threshold value, controller 5 changes, based on the vibration information, the display mode of virtual image 300 displayed by display unit 40. A (computer) program according to an aspect is a program for causing a computer system to execute the method for controlling display system 10.

Modifications of the above embodiment will be described below. Modifications described below can be applied in appropriate combination.

An executing subject of display system 10, information presentation system 20, or the method for controlling display system 10 according to the present disclosure includes a computer system. The computer system mainly includes a processor as hardware and a memory. The processor executes the program stored in the memory of the computer system, so that function, as the executing subject of display system 10, information presentation system 20, or the method for controlling display system 10 according to the present disclosure, is realized. The program may be stored in the memory of the computer system in advance, may be supplied through a telecommunication line, or may be supplied in the state where the program is stored in the non-transitory recording medium which can be read by the computer system. Examples of this type of the non-transitory recording medium includes a memory card, an optical disk, and a hard disk drive. The processor of the computer system is composed of one or a plurality of electronic circuits including semiconductor integrated circuit (IC) or large-scale integration (LSI). The plurality of electronic circuits may be integrated in one chip, or may be provided on a plurality of chips so as to be dispersed. The plurality of chips may be integrated in one device, or may be provided on a plurality of devices so as to be dispersed.

Functions of obtaining unit 6, display unit 40, and controller 5 of display system 10 may be provided on two or more systems so as to be dispersed. A function of controller 5 of display system 10 may be realized by, for example, cloud (cloud computing).

Information presentation system 20 is realized with display system 10 and detection system 7. However, information presentation system 20 is not limited to this configuration. Information presentation system 20 may be realized with, for example, one of display system 10 and detection system 7. For example, a function of detection system 7 may be integrated in display system 10.

Controller 5 in display system 10 may determine the content of virtual image 300 based on information obtained by communication between a communicator included in display system 10 or vehicle 100 and an outside. Controller 5 may determine the content of virtual image 300 based on information obtained by an inter vehicle communication (V2V: Vehicle-to-Vehicle) between vehicle 100 and a peripheral vehicle, an intervehicle and road-vehicle communication (V2X: Vehicle-to-Everything) between vehicle 100 and the peripheral vehicle or infrastructure, or the like. The content of virtual image 300 projected onto target space 400 may be determined by the infrastructure. In this case, at least a part of controller 5 may not be installed on vehicle 100.

Moreover, display system 10 is not limited to the configuration of projecting virtual image 300 onto target space 400 set in front of vehicle 100 in the traveling direction. For example, display system 10 may project virtual image 300 in a side direction, a rear direction, or an upper direction and the like in the traveling direction of vehicle 100.

In addition, display system 10 is not limited to the head-up display for use in vehicle 100. For example, display system 10 is also applicable for a mobile body other than vehicle 100. Examples of the mobile body other than vehicle 100 includes a motorcycle, a train, an aircraft, a construction machine, and a vessel. Moreover, the place of use of display system 10 is not limited to the mobile body. For example, display system 10 may be used in an amusement facility. Display system 10 may also be used as a wearable terminal such as Head Mounted Display (HMD). Furthermore, display system 10 may be used at a medical facility, and may be used as a stationary device.

Although display unit 40 of display system 10 includes movable screen 1a and fixed screen 1b, it is sufficient that display unit 40 includes at least movable screen 1a.

Display unit 40 is not limited to the configuration of projecting the virtual image by a laser beam. For example, display unit 40 may also be configured so that a projector projects an image (virtual image 300) onto a diffuse transmission type screen 1 from behind screen 1. Display unit 40 may project, through projection optical system 4, virtual image 300 corresponding to an image displayed by a liquid crystal display.

The reflection member which reflects the light emitted from display unit 40 is composed of windshield 101 of vehicle 100. The reflection member is not limited to windshield 101. The reflection member may be a transparent plate provided separately from windshield 101.

SUMMARY

As described above, the display system (10) according to a first aspect includes, in the first aspect, the display unit (40), the controller (5), and the obtaining unit (6). The display unit (40) displays a virtual image (300 to 305, 304A, 304B, 305A) in the target space (400). The controller (5) controls the display of the display unit (40). The obtaining unit (6) obtains vibration information about vibration applied to the display unit (40). When the vibration exceeds the first threshold value and the viewing distance of the virtual image (300 to 305, 304A, 304B, 305A) exceeds the second threshold value, the controller (5) changes the display mode of the virtual image (300 to 305, 304A, 304B, 305A) based on the vibration information.

According to the first aspect, when the vibration exceeds the first threshold value, and the viewing distance exceeds the second threshold value, blurring of the virtual image (300 to 305, 304A, 304B, 305A) can be made less noticeable compared with the case where the display mode of the virtual image (300 to 305, 304A, 304B, 305A) does not change. Accordingly, the deviation of the display position of the virtual image (300 to 305, 304A, 304B, 305A) can be made less noticeable.

In the display system (10) according to a second aspect, in the first aspect, the display mode is transmittance of the virtual image (300 to 305, 304A, 304B, 305A).

According to the second aspect, visibility of the virtual image (300 to 305, 304A, 304B, 305A) can be changed by changing the transmittance. Accordingly, the deviation of the display position of the virtual image (300 to 305, 304A, 304B, 305A) caused by the vibration can be made less noticeable.

In the display system (10) according to a third aspect, in the first or second aspect, the display mode is the size of the virtual image (300 to 305, 304A, 304B, 305A).

According to the third aspect, by increasing the size of the virtual image (300 to 305, 304A, 304B, 305A), even when the position deviates by the vibration, the positional deviation between an object which exists in the real space and the virtual image (300 to 305, 304A, 304B, 305A) becomes less noticeable. In contrast, by reducing the size of the virtual image (300 to 305, 304A, 304B, 305A), the virtual image (300 to 305, 304A, 304B, 305A) itself becomes less noticeable. Hence, the positional deviation can be made less noticeable.

The display system (10) according to a fourth aspect, in any one of the first to third aspects, the display mode is the shape of the virtual image (300 to 305, 304A, 304B, 305A).

According to the fourth aspect, the shape of the virtual image (300 to 305, 304A, 304B, 305A) can be changed into such a shape that the positional deviation of the virtual image (300 to 305, 304A, 304B, 305A) caused by the vibration is less noticeable.

In display system (10) according to a fifth aspect, in the fourth aspect, the controller (5) changes the shape of the virtual image (300 to 305, 304A, 304B, 305A) so that the viewing distance becomes less than or equal to the second threshold value.

According to the fifth aspect, by changing the shape of the virtual image (300 to 305, 304A, 304B, 305A) into such a shape having a viewing distance less than or equal to the second threshold value, the positional deviation caused by the vibration becomes less noticeable, compared with the case where the virtual image (300 to 305, 304A, 304B, 305A) having a viewing distance exceeding the second threshold value is displayed.

In the display system (10) according to a sixth aspect, in any one of the first to fifth aspects, the vibration is a change over time in the orientation of the display unit (40).

According to the sixth aspect, by using the detection result of the sensor (71) for detecting the orientation of the display unit (40), it can be determined whether or not the vibration applied to the display unit (40) exceeds the first threshold value.

The information presentation system (20) according to a seventh aspect includes the display system (10) according to any one of the first to sixth aspects, and the detection system (7) which detects vibration applied to the display unit (40). The obtaining unit (6) obtains detection information from the detection system (7).

According to the seventh aspect, it is possible to realize the information presentation system (20) capable of making the deviation of the display position of the virtual image less noticeable.

The method for controlling the display system (10) according to an eighth aspect is a method for controlling the display system (10) including the display unit (40), the controller (5), and the obtaining unit (6). The display unit (40) displays the virtual image (300 to 305, 304A, 304B, 305A) in the target space (400). The controller (5) controls the display of the display unit (40). The obtaining unit (6) obtains vibration information about vibration applied to the display unit (40). In the control method according to the eighth aspect, when the vibration exceeds the first threshold value and the viewing distance of the virtual image (300 to 305, 304A, 304B, 305A) exceeds the second threshold value, the controller (5) changes the display mode of the virtual image (300 to 305, 304A, 304B, 305A) based on the vibration information.

According to the eighth aspect, when the vibration exceeds the first threshold value, and the viewing distance exceeds the second threshold value, the positional deviation of the virtual image (300 to 305, 304A, 304B, 305A) can be made less noticeable, compared with the case where the display mode of the virtual image (300 to 305, 304A, 304B, 305A) does not change.

The program according to a ninth aspect is a program for causing a computer system to execute the method for controlling the display system (10) according to the eighth aspect.

The mobile body (100) according to a tenth aspect includes: the display system (10) according to any one of the first to sixth aspects, and the reflection member (101). The reflection member (101) has light transmitting properties, and reflects the light emitted from the display unit (40) so that the virtual image (300 to 305, 304A, 304B, 305A) is viewed by the target person (200).

According to the tenth aspect, it is possible to realize the mobile body (100) capable of making the deviation of the display position of the virtual image less noticeable.

The configurations according to the second to sixth aspects are not essential configurations for the display system (10), and the configurations may be appropriately omitted.

REFERENCE MARKS IN THE DRAWINGS

1 screen
1a movable screen
1b fixed screen
2 drive unit
3 irradiator
4 projection optical system
5 controller
6 obtaining unit
7 detection system
10 display system
20 information presentation system
40 display unit
41 magnifying lens
42, 43 mirror
52 display controller
71 vibration detector
100 vehicle (mobile body)
101 windshield (reflection member)
102 dashboard
110 main body
200 user (target person)
300 to 306, 304A, 304B, 305A virtual image
400 target space
500 optical axis
501, 502 virtual plane
503 reference plane
600 road surface
700 obstacle

The invention claimed is:

1. A display system which projects an image to be viewed by a target person as if a virtual image is being projected onto a target space, the display system comprising:
   a display unit which displays the image;
   a controller which controls display of the display unit; and
   a vibration information obtaining unit which obtains vibration information about vibration applied to the display unit,
   wherein the controller changes a display mode of a portion of the virtual image based on the vibration information, when the vibration exceeds a first threshold value and a viewing distance of the portion of the virtual image exceeds a second threshold value.

2. The display system according to claim 1,
   wherein the display mode is a transmittance of the portion of the virtual image.

3. The display system according to claim 1,
   wherein the display mode is a size of the portion of the virtual image.

4. The display system according to claim 1,
   wherein the display mode is a shape of the portion of the virtual image.

5. The display system according to claim 4,
   wherein the controller changes the shape of the portion of the virtual image so that the viewing distance becomes less than or equal to the second threshold value.

6. The display system according to claim 1,
   wherein the vibration is a change over time in an orientation of the display unit.

7. An information presentation system comprising:
   the display system according to claim 1; and
   a detection system which detects the vibration applied to the display unit,
   wherein the vibration information obtaining unit obtains the vibration information from the detection system.

8. A mobile body comprising:
   the display system according to claim 1; and
   a reflection member which has a light transmitting property, and reflects light emitted from the display unit so that the virtual image is viewed by the target person.

9. A method for controlling a display system which projects an image to be viewed by a target person as if a virtual image is being projected onto a target space, the display system including a display unit which displays the image, a controller which controls display of the display unit, and a vibration information obtaining unit which obtains vibration information about vibration applied to the display unit, the method comprising
   causing the controller to change a display mode of a portion of the virtual image based on the vibration information, when the vibration exceeds a first threshold value and a viewing distance of the portion of the image exceeds a second threshold value.

10. A non-transitory machine-readable recording medium that stores a program for causing a computer system to execute the method for controlling the display system according to claim 9.

* * * * *